US006715929B2

United States Patent
Watanabe et al.

(10) Patent No.: US 6,715,929 B2
(45) Date of Patent: Apr. 6, 2004

(54) OPTICAL MULTIPLEXING MODULE AND METHOD OF CORRECTING OPTICAL AXIS THEREOF

(75) Inventors: Yasuhiro Watanabe, Tokyo (JP); Satoru Abe, Tokyo (JP); Hiroshi Matsuura, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 282 days.

(21) Appl. No.: 09/924,493

(22) Filed: Aug. 6, 2001

(65) Prior Publication Data
US 2002/0039471 A1 Apr. 4, 2002

(30) Foreign Application Priority Data

Aug. 21, 2000 (JP) ............................. 2000-249627
Aug. 21, 2000 (JP) ............................. 2000-249628
Jun. 20, 2001 (JP) ............................. 2001-185811

(51) Int. Cl.[7] ............................................. G02B 6/38
(52) U.S. Cl. ............................................. 385/73
(58) Field of Search .................... 385/24, 36, 73, 385/74; 398/86, 88

(56) References Cited

U.S. PATENT DOCUMENTS 4,156,556 A * 5/1979 Klein et al. ............. 385/47
5,510,932 A * 4/1996 Go et al. ............. 359/341.1
5,786,915 A * 7/1998 Scobey ............. 398/82
5,859,717 A * 1/1999 Scobey et al. ............. 398/79
6,389,193 B1 * 5/2002 Kimmel et al. ............. 385/25

* cited by examiner

Primary Examiner—Neil Abrams
Assistant Examiner—Thanh-Tam Le
(74) Attorney, Agent, or Firm—Oblon, Spivak, McClelland, Maier & Neustadt, P.C.

(57) ABSTRACT

An optical multiplexing module, which is easier in adjustment of an optical axis, has an optical multiplexing element and a prism to change optical paths of input light. The module also has one or more input collimators at the input-side end thereof a single output collimator at the output-side end thereof. The optical axes of the collimators are adjustable by optical axis adjusting means.

Further, according to the method of correcting the optical axes, after fabricating the collimators into the module, with an optical loss between optical parts monitored, an external force is applied in turn to a plurality of arbitrary locations around a joint portion of one optical part. This application allows a hit location showing a maximum reduction in optical loss to be found out. Radiating a laser beam onto an opposite-side location on the joint portion to the hit location leads to an easier correction of displacements of the optical axis with ease.

13 Claims, 7 Drawing Sheets

(A)

(B)

OPTICAL MULTIPLEXING MODULE AND METHOD OF CORRECTING OPTICAL AXIS THEREOF

BACKGROUND OF INVENTION

The present invention relates to an optical multiplexing module wherein the optical axis can be aligned between at least two collimators, each fixed to a cylindrical member, arranged at the input and output ends of the module, and a method for aligning the optical axis thereof.

RELATED ART

There has been known an optical multiplexing module that has at least two collimators and a cylindrical member wherein the collimators are fixed with their optical axes aligned to each other. FIG. 7 exemplifies the structure of such an optical multiplexing module 100, wherein a section of the module is outlined. The module 100 has two collimators 102 and 104 secured to the input-side end thereof and one collimator 110 at the output-side end thereof. Optical rays that enter the collimators 102 and 104 are multiplexed into the collimator 110 with the help of a prism 106 and an optical connector 108.

In manufacturing such module 100, it is required that optical axes be aligned (also known as "alignment adjusting") so that an optical loss between both of the optical-input collimators 102 and 104 and the optical-output collimator 110 are minimized. The collimator(s) is fixed in position in the cylindrical member 112 at one side thereof, and then the collimator(s) is adjusted to an optimum alignment position that minimizes optical losses.

Joint portion(s) between the collimators 102 and 104 or collimator 110 and the cylindrical member 112 are then fixedly connected with laser welding such as a YAG laser. The collimators 102, 104, and 110 are inserted into cylindrical cavities 118, 120, and 122 drilled in the cylindrical member 112, respectively, and secured there. An outer surface of each of the collimators 102, 104 and 110 makes a circular line contact with an inner circumferential edge of each of the cylindrical cavities 118, 120 and 122, thus forming the joint portions. That is, each joint portion is circular in its contacted shape. Laser beams are irradiated onto each circular joint portion at twelve to fifteen points in such a manner that all the positions are equally spaced to each other.

The radiation is carried out, for example, such that, at first, laser beams are simultaneously irradiated onto equally spaced three points on the circumference, then the three irradiated positions are shifted on the circumference for simultaneous irradiation onto the new three points. In this way, as irradiated positions are shifted, the simultaneous irradiation onto three points is carried out two or three times. As a result, the radiation permits each joint portion secured by welding at the twelve to fifteen locations on the circumference. Each collimator is thus secured to the cylindrical member 112.

However, the laser welding technique causes the irradiated points to have different amount of contraction due to changes in laser's radiated positions, irregularities of laser power, and/or differences in states of the welded locations. It is frequent that, as to at least one of the collimators 102, 104 and 110, the finally secured collimator angle results in an unexpected change from its optimum alignment angle that has been adjusted during its connection into the cylindrical member. Therefore, once such a situation occurs, the optical axes are mutually different between the input collimators 102 and 104 and the output collimator 110. This will lead to the problem that optical losses of the collimators in the secured state within the cylindrical member 112 are higher than expected.

It has therefore been long desired that an optical multiplexing module that causes no displacements in its optical axes, which might occur when at least two after-alignment optical parts are secured to a cylindrical member with welding, and a method of correcting such optical axes.

SUMMARY OF INVENTION

A first embodiment of the invention is an optical multiplexing module comprising:
- (a) a cylindrical member (12) which is provided with an intermediate cavity (35), an optical multiplexing element (34), a prism (32) for changing an optical path of incidence light, which are aligned along an optical axis in the cavity (35), a first cylindrical cavity (26, 28) formed at an input side of the cylindrical member (12), and a second cylindrical cavity (30) formed at an output side of the cylindrical member (12);
- (b) an output collimator (18) inserted and fixed in the second cylindrical cavity (30); and
- (c) one or more input collimators (14, 16) inserted and fixed in the first cylindrical cavity (26, 28), an optical axis of the input collimators toward the output collimator (18) being adjustable by an optical axis adjusting means.

A second embodiment of the present invention is the optical multiplexing module, wherein the optical axis adjusting means for the input collimators comprises
- (a) a ring (38) having a first end surface (38b) welded to an end surface of the cylindrical member (12) and a second end surface (38a) oppositely positioned to the first end surface, each of the first and second end surfaces forming a spherical surface, and
- (b) a flange (42) being formed at an intermediate part of a cylinder of the collimator and having a tip (40) formed as a flat surface, the flange being line-contacted to the spherical surface (38a) and being welded to the ring.

A third embodiment of the present invention is the optical multiplexing module, wherein the welding is laser welding.

A fourth embodiment of the present invention is the optical multiplexing module, wherein the laser welding is either one of YAG laser welding and excimer laser welding.

A fifth embodiment of the present invention is the optical multiplexing module, wherein the welding is carried out so that an intensity of input light to the module and an intensity of output light from the module are measured and a loss between the measured intensity is minimized.

A sixth embodiment of the present invention is the optical multiplexing module, wherein, after the welding, the strength of input light to the module and the intensity of output light from the module are measured again, and the welding is carried out so that the loss between the measured intensity are minimized.

A seventh embodiment of the present invention is a method of adjusting an optical axis of an optical multiplexing module, comprising the steps of:
- (a) preparing a cylindrical member (12) which is provided with an intermediate cavity (35), an optical multiplexing element (34) and a prism (32) for changing an optical path of incidence light which are contained along an optical axis in the cavity (35), a first cylindrical cavity (26, 28) formed at an input side of the cylindrical member (12), and a second cylindrical cavity (30) formed at an output side of the cylindrical member (12);

(b) inserting an output collimator (18) into a cylinder of the second cylindrical cavity (30), then securing the output collimator in the cylindrical member (12) by welding; and (c) inserting one or more input collimators (14, 16) into the first cylindrical cavity (26, 28), then adjusting optical axes of the input collimators and the output collimator and fixing so that a measured optical loss between the input and output collimators is minimized.

An eighth embodiment of the present invention is the method of adjusting the optical axis of the optical multiplexing module, wherein the adjusting and fixing include (a) spot-welding a ring (38) to an end surface of the cylindrical member (12), the ring having a first end surface (38b) and a second end surface oppositely positioned to the first end surface, each of the fist and second end surfaces being formed as a spherical surface (38a), and (b) contacting a tip (40) of a flange (42) being formed at an intermediate part of a cylinder of the collimator with the spherical surface (38a) of the ring, then adjusting an angle of the flange (42) to the ring (38) and spot-welding the flange to the ring.

A ninth embodiment of the present invention is the method of adjusting the optical axis of the optical multiplexing module, wherein the fixing is carried out a plurality of times.

A tenth embodiment of the present invention is the method of adjusting the optical axis of the optical multiplexing module, wherein the fixing carried out at and after the second time comprising:

(a) monitoring an optical loss between the optical input-side collimators and the optical output-side collimator, and applying an external force in turn to a plurality of arbitrary positions along a peripheral of a connected part of one collimator to search a hit point showing a maximum reduction in the optical loss, and (b) carrying out the spot welding at a position (80) of the collimator opposite to the hit point by 180 degrees.

An eleventh embodiment of the present invention is the method of adjusting the optical axis of the optical multiplexing module, wherein the spot welding is laser welding.

A twelfth embodiment of the present invention is the method of adjusting the optical axis of the optical multiplexing module, wherein the laser welding is either one of a YAG laser and an excimer laser.

DETAILED DESCRIPTION OF THE PREFERRED EMBODIMENT

Figure 1:
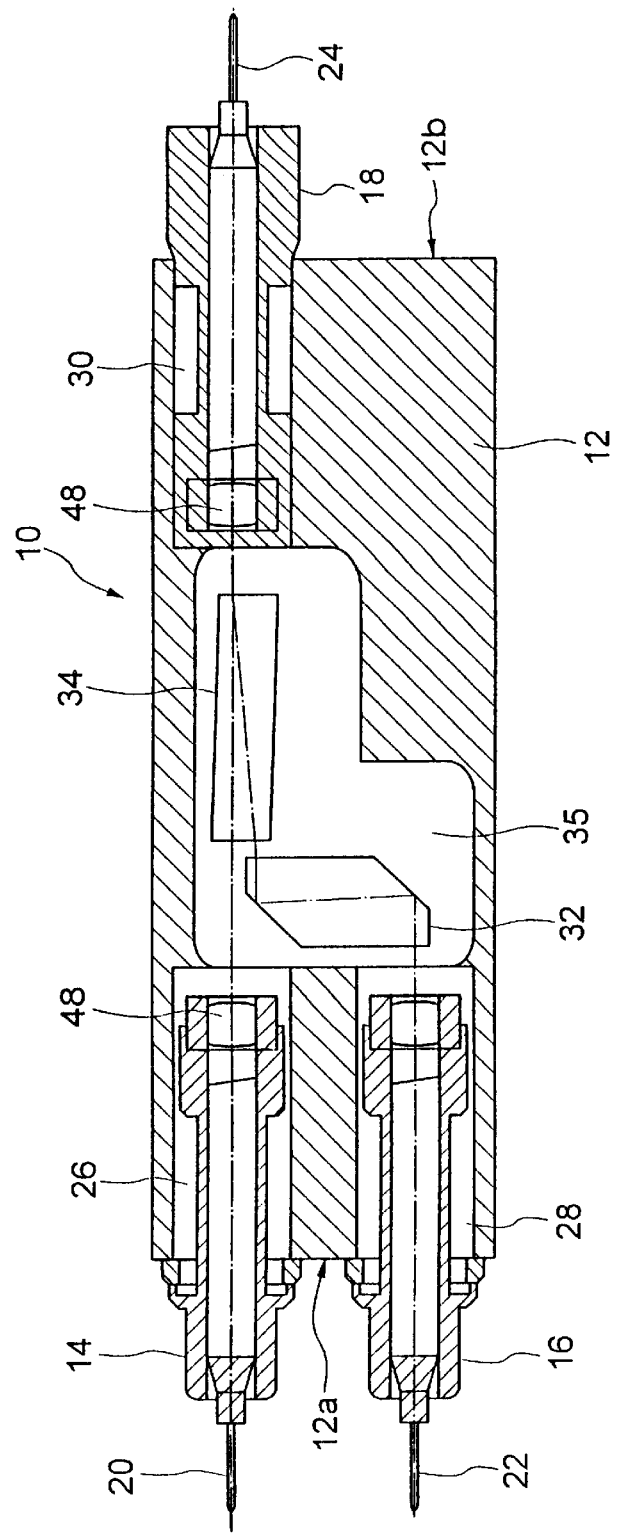
FIG. 1 is a schematic view showing the configuration of an optical multiplexing module according to an embodiment of the present invention.

With reference to the accompanying drawings, embodiments of the present invention will now be described. Each drawing only outlines the shape and size of each constituent and the relationship of arrangement of the constituents for understanding the present invention, hence the present invention is not limited to the examples shown in the drawings. Further, for the sake of an easier understanding of the drawings, the hatching indicating a section is omitted here except some parts. In the embodiment, an example of an optical multiplexing module that has collimators at both optical input and output ends of the module will now be described in detail, together with an example of a method of correcting in position an optical axis of the module. FIG. 1 is a sectional view showing an outlined configuration of an optical multiplexing module according to an embodiment.

Described hereinafter is an embodiment wherein the number of sets of input-side collimators are two, but the collimator's number is not restricted to two sets. The number of prisms which corresponds to that of the collimators contained within a cylindrical member can be variable to the number of sets of calumniators, such as, three sets or four sets.

An optical multiplexing module 10 has a cylindrical member 12, input collimators 14 and 16 and an output collimator 18 both fixed in the cylindrical member 12. Within an intermediate portion of the cylindrical member 12, there is formed a cylindrical cavity, wherein an optical multiplexing element 34 and a prism 32 are contained. The prism 32 is contained to change an optical axis of input light radiated from the input collimator 16 located at a displaced position from the output collimator 18. The optical multiplexing element is formed of, for example, a polarizing separation element. Moreover, the prism 32 is composed of an anisotropic prism. Connected to the input collimator 14 is a first input fiber 20, while connected to the output collimator 16 is a second input fiber 22. An output fiber 24 is connected to the output collimator 18.

First and second cylindrical cavities 26 and 28 are formed at an input-side end 12a of the cylindrical member 12. The input collimators 14 and 16, which are coupled with the input-side first and second input fibers 20 and 22, are fixed to the first and second cylindrical cavities 26 and 28. This allows input light to be entered into the cylindrical member 12 through the first and second input fibers 20 and 22 and to be multiplexed or combined to each other by the prism 32 and optical multiplexing element 34. The combined light is provided to the output fibs 24.

This optical multiplexing module 10 is fabricated as follows. First, the output collimator 18 is inserted into a cylindrical cavity 30 formed at an output-side end 12b of the cylindrical member 12, then secured therein with laser welding, such as YAG welding. The input collimators 14 and 16 are inserted into the first and second cylindrical cavities 26 and 28 formed at the input-side end 12a, as their optical axes are made to align with the output collimator 18, and then fixed therein, respectively.

In the present embodiment, a joint portion between the first cylindrical cavity 26 formed at the input-side end 12a and the input collimator 14 is structured as follows.

Incidentally, another joint portion between the second cylindrical cavity 28 and the input collimator 16 is also structured in the same manner.

Figure 2:
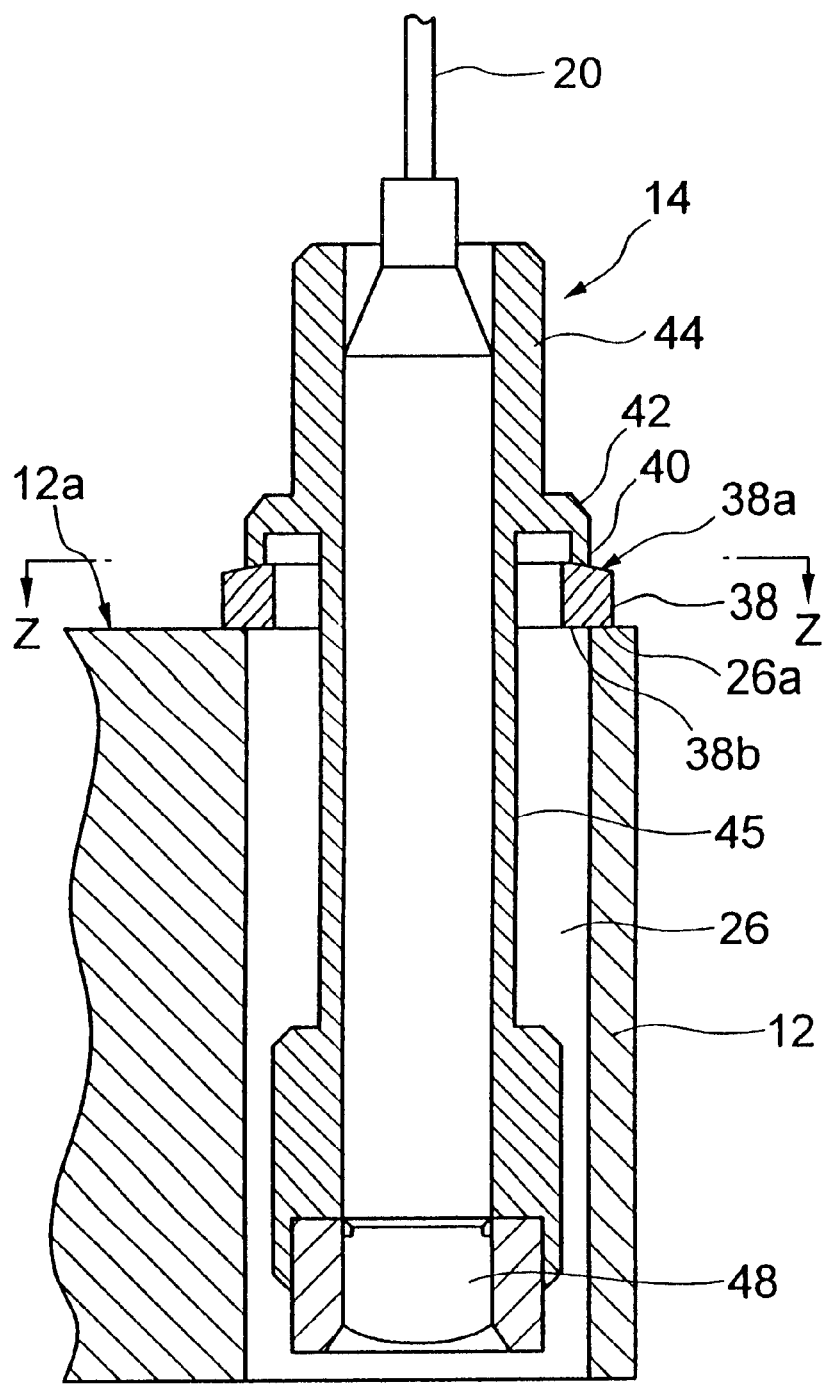
FIG. 2 is an enlarged view showing an essential part of one collimator shown in FIG. 1.
Figure 3:
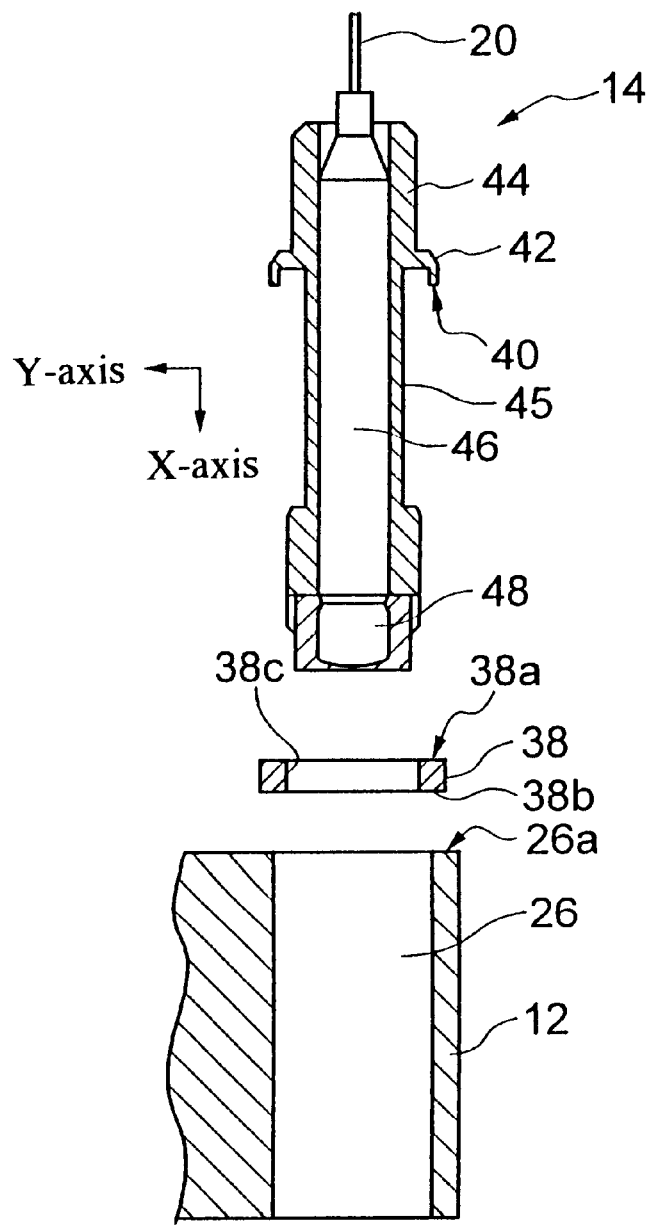
FIG. 3 is a schematic view showing each constituent of the collimator represented before the collimator is inserted into the cylindrical member.

FIG. 2 is an enlarged view of the joint portion between the collimator and the cylindrical member and FIG. 3 is a view illustrating a state under which the collimator has not been connected to the cylindrical member yet.

As shown in FIG. 2, the collimator 14 is composed of a cylinder 44, a collimator lens 48 attached to one tip thereof, and an optical fiber 20 coupled with the other end. A ring 38 is attached to the first cylindrical cavity 26 in such a manner that a lower surface 38b of the ring 38 faces and is welded to the end surface of 26a of the first cylindrical cavity 26. The opposite upper surface 38a of the ring 38 to the lower surface 38b is shaped into a sphere having a predetermined radius.

Further, at an intermediate position of the cylinder 44, a flange 42 is formed. The flange 42 has a flat-surface tip 40, so that the tip 40 is made to contact the spherical surface 38a of the ring 38 via a line-shaped contact. The spherical surface 38a of the ring 38 and the tip 42 of the flange, that is, the input collimator 14 are coupled and fixed to each other with laser welding. As described above about the input collimator 14, the other input collimator 16 is welded and fixed to the end portion of the second cylindrical cavity 28 of the cylindrical member 12 via the ring 38.

The connection of the collimator to the cylindrical member will now be explained. In the case of a construction example shown in FIG. 3, the input collimator 14 has a tube-like cylinder 44, a bore-like cavity 46 formed through the cylinder 44, a first input fiber 20 connected to one end of the cavity 46, and a lens 48 fixed to the cavity 46 at the other end. Furthermore, a flange 42 is integrally formed on an intermediate location of the cylinder 44.

The spherical surface 38a of the ring 38 is made to abut on the flat surface of the tip 40 of the flange 42, thus forming a line contact therebetween. It is therefore easily possible to adjust the direction of the collimator in an X-direction (optical axis). Thus, with the optical axes made to align with each other among the collimators, those collimators are made to abut on the cylindrical member, respectively, before the joint portions are welded to each other so that displacements of the optical axes between the module's optical parts are corrected. Specifically, it is preferable that, after the welding for the connections, as an optical loss between the input and output collimators monitored, laser welding is carried out so as to minimize the optical loss. As the laser welding, as will be described, it is preferable that a YAG laser or excimer laser is used.

In the foregoing, the input collimator 14 is connected to the cylindrical member 12 with the help of a not-shown fitting sustaining the input collimator 14. Practically, first, using the fitting, the input collimator 14 is adjusted in direction so that the side of the lens 48 is directed to the end 26a of the first cylindrical cavity 26. Then, in order that an optical loss of light entering into the output collimator 18 is minimized, various factors are adjusted as the not-shown fitting is moved. Such various factors are X-directional and Y-directional positions of the cylindrical member 12 in the plain including the end 26a of the first cylindrical cavity 26, an angle of the cylindrical member 12 in the X-direction, and an angle of the cylindrical member 12 in the Y-direction. That is, optical axes are aligned between the input collimator 14 and the output collimator 18.

Then, the ring 38 is placed on the end surface 26a of the first cylindrical cavity 26 with the spherical surface 38a directed to the input collimator 14. The structure of the ring 38 is shown in FIGS. 4A and 4B, wherein FIG. 4A is a sectional view of the ring 38 and FIG. 4B is a plan view of the ring 38.

Figure 4:
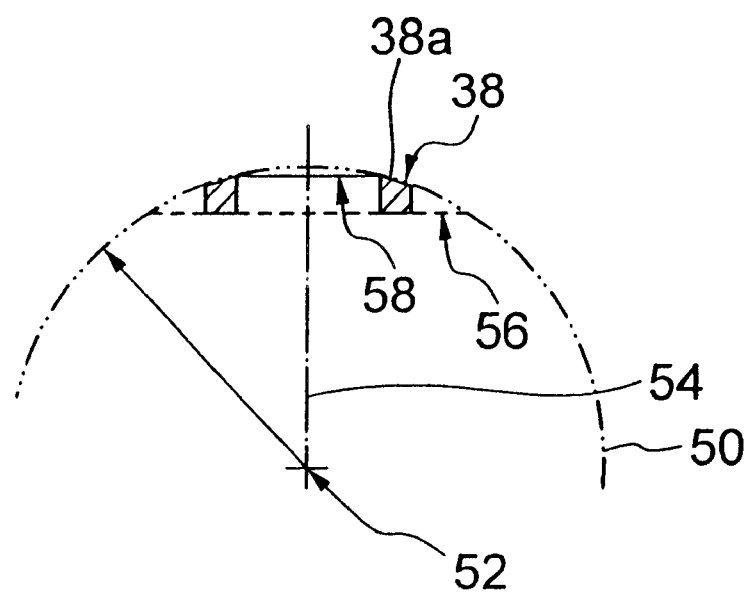
FIG. 4A is a sectional view of a ring used to fix the collimator.
FIG. 4B is a plan view of the ring.
Figure 4:
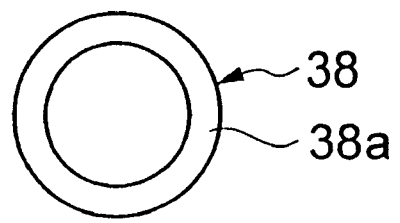

The spherical surface 38a shown in FIG. 4A is obtained by cutting a sphere 50 with two perpendicular surfaces 56 and 58 to an axis 54 passing the center 52 of the sphere 50. The size of this sphere 50 is appropriately determined according to the area of the tip 40 of the flange 42 under the condition that the tip 40 of the flange 42 is always made to abut on the spherical surface 38a.

Figure 5:
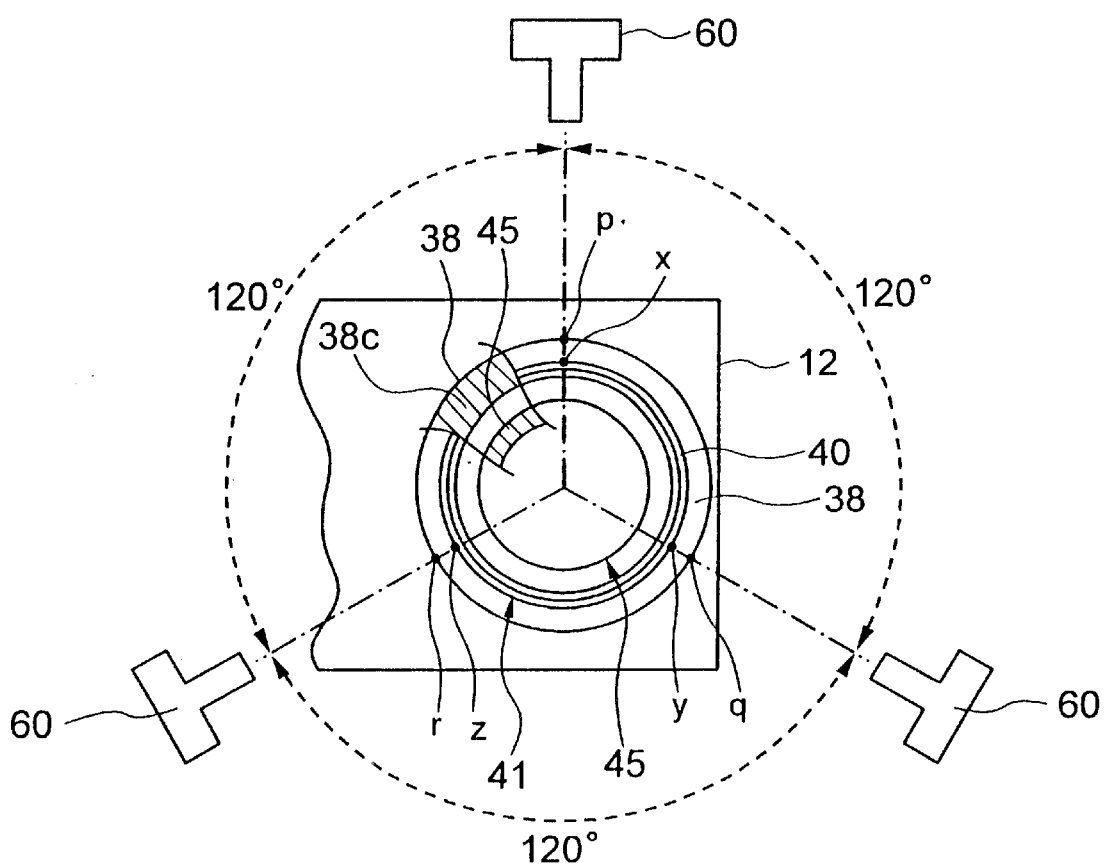
FIG. 5 is a schematic view showing not only the positional relationship among the ring, the tip of a flange, and a cylinder of the collimator but also arranged positions of laser heads.

FIG. 5 is a view outlining a positional relationship among the ring, tip of the flange, and the cylinder of the collimator and arranged positions of laser heads 60, which is realized when the collimator 14 is connected to the cylindrical cavity 26 with the ring 38. FIG. 5 which is viewed from an input side of the cylindrical member, includes a section cut along a Z—Z plane in FIG. 2.

An inner circle 38c of the ring 38, which is shown in FIG. 4B, is larger than an outer circumferential circle 45 of the cylinder 44 of the input collimator 14 or input collimator 16, but smaller than a circle 41 formed by the tip 40 of the flange 42. With the spherical surface 38a of the ring 38 made to contact the tip 40 of the flange 42 of the input collimator 14, a joint portion between the ring 38 and the end 26a of the cylindrical cavity 26 is welded to be fixed to each other. Then, a contact part between the spherical surface 38a and the tip 40 is welded so that the both are fixed to each other.

In this example, laser beams are simultaneously radiated to three locations (p, q, r) specified at equal intervals on the outer circumference of the ring 38. To realize this, three laser heads 60 are arranged around the cylindrical member 12 at intervals of 120 degrees, with the result that radiation of laser beams is carried out from the three directions. This way of radiation is able to suppress positional shifts occurring at the joint portions to a minimum, the positional displacements being caused by shocks of radiation. This radiation is repeatedly carried out, four to five times as their radiated locations are shifted in turn, thus forming twelfth to fifteen welding fixed locations per joint portion. YAG laser or exima laser is smaller in the area of a welding-fixed part, so that such laser is preferable in that it has smaller amounts of solidification and contraction as well as fewer deformations after the welding.

After this, the input collimator 14 of which optical axis has been aligned is inserted into the first cylindrical cavity 26, and then the spherical surface 38a of the ring 38 is made to abut on the tip 40 of the flange 42 of the input collimator 14. Then, to a circular part 41 to be connected between the spherical surface 38 and the flange tip 40, laser beams are radiated so as to form twelfth to fifteen welded locations at equal intervals. This welding is carried out by simultaneously radiating laser beams onto three locations (for example, x, y and z shown in FIG. 5) specified at equal intervals. This radiation of the laser beams is repeated four to five times with radiated locations moved. In the case of using a YAG laser, radiation energy is set to 6.4 J, for example.

Like the input collimator 14, the input collimator 18 is also welded and fixed to the second cylindrical cavity 28 of the cylindrical member 12 using the ring 38.

However, twelve to fifteen of welded and fixed locations differ in degrees of contraction, location by location, depending on radiated positions and power values of welding beams, and/or, physical states of locations to be welded. Hence, the input collimator 14 and input collimator 16 may be fixed at a tilt than compared to a state wherein the optical axis alignment was carried out. If such a case happens, amounts of optically coupled loss between the input collimator 14 and the output collimator 18, and, between the input collimator 16 and the output collimator 18 may rise by some 15 dB at its maximum.

Figure 6:
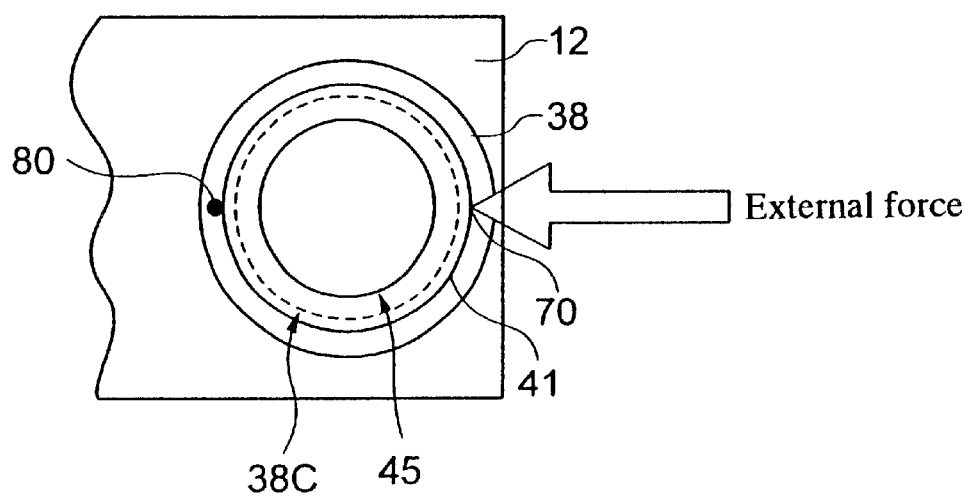
FIG. 6 exemplifies a position at which an optical loss is reduced and an irradiated position of a laser.
Figure 7:
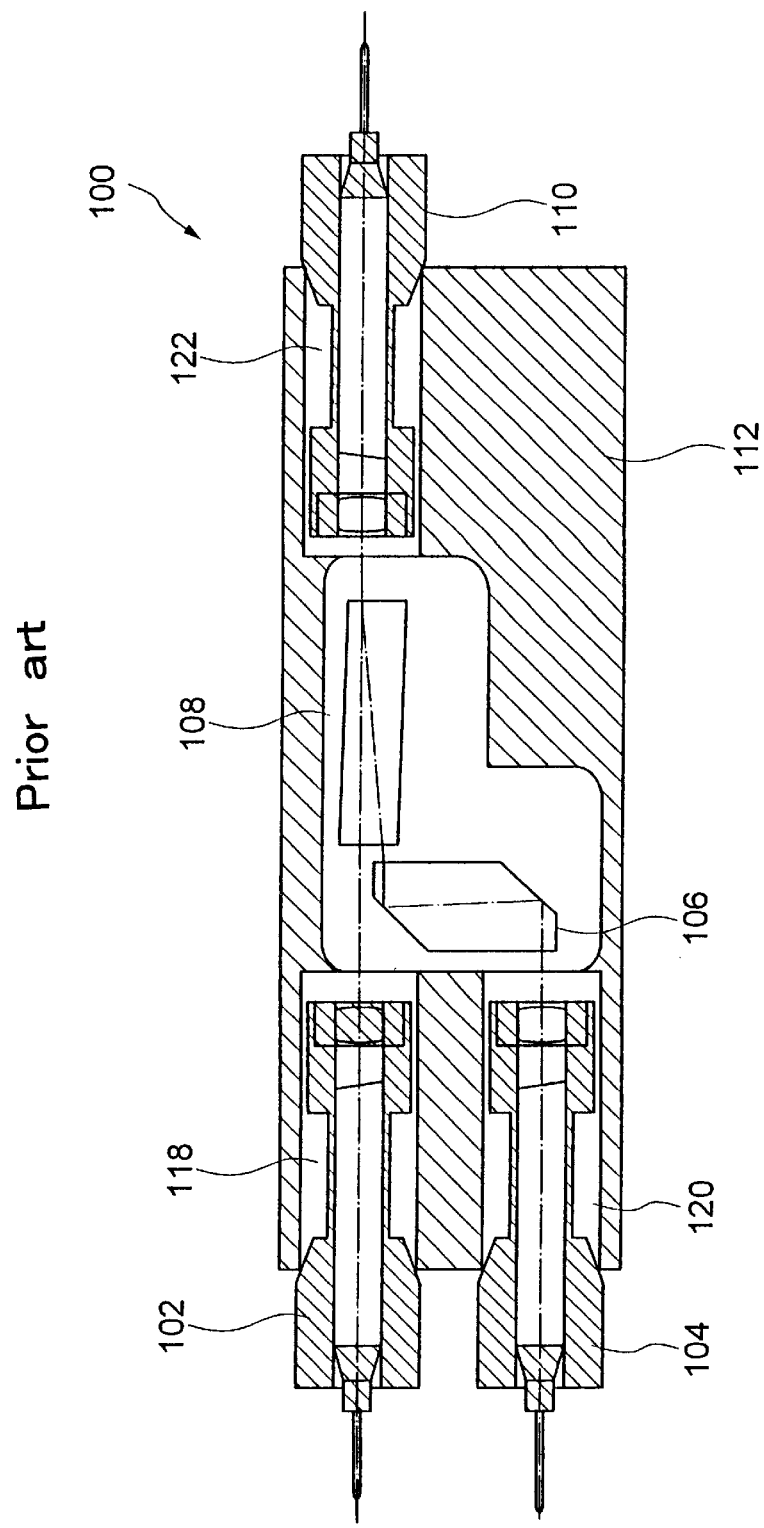
FIG. 7 shows the configuration of a conventional optical module.

In such a case, displacements of the optical axis of the collimator should be corrected using a technique shown in FIG. 6, which will now be described. First, as an optical loss caused between the optical input-side and optical output-side collimators is monitored, an external force is applied in turn to a plurality of arbitrary locations around the joint portion of one collimator. This application makes it possible to find out a hit location that shows a maximum reduction in the optical loss. This search for the optical loss is done based on, for example, the method of testing passive parts for optical transmutation regulated on JIS C5901.

In this example, a metal-made rod is pushed to arbitrary locations around the cylinder of the input collimator 14 or the input collimator 16, resulting in that an external force is applied thereto. With the external force applied in this way, an optical loss between each of the input collimators 14 and 16 and the output collimator 18 is monitored, a hit location 70 is found out, which shows a maximum reduction in the optical loss to the external force applied.

A laser beam is then radiated to a location 80 of the joint portion oppositely (180 degrees) located to the hit location 70 with the collimator therebetween. In other words, when the welded joint portion is circular, re-radiating a laser beam to an opposite location, by 180 degrees, to the hit location in the diameter direction enables displacements of the optical axis occurring at the joint portion to be readjusted.

The location 80 onto which the laser beam has been radiated dissolves before being solidified, during which time the location 80 contracts. This contraction force is utilized to correct a tilt of the input collimator 14 caused by its welded fixing. For confirming correction of displacements of the optical axis of the collimator, a radiation experiment was conducted, wherein a laser's radiation position was finely changed in the neighborhood of a determined radiation position on a joint portion. It has been confirmed by this experiment that, as long as laser's radiation energy is kept to the same amount, the radiation onto the flange exhibits the highest capability for the correction.

Through this experiment, it has been found that radiation required to correct optical axis displacements is effectively conducted by changing amounts of radiation energy of a YAG laser, depending on an increment of an optical loss value measured after the welding from that measured at the optical axis alignment Various optimum values of radiation energy to increments of optical loss values are shown in Table 1.

TABLE 1

| Increment of amounts of optical loss | Radiation energy of YAG laser |
| --- | --- |
| 0.1 dB | 2.0 J |
| 0.1~0.3 dB | 4.2 J |
| 0.3~0.5 dB | 5.1 J |
| 0.5~1.0 dB | 5.7 J |
| 1.0~2.0 dB | 6.4 J |
| 2.0~3.0 dB | 7.0 J |
| 3.0 dB~ | 7.5 J |

Table 1 shows that when an increment of the optical loss value is less than 0.1 dB, a radiation energy amount of 2.0 J is preferable, while the increment is 0.1 to 0.3 dB, the radiation energy amount of 4.2 J is preferable. Also, it was found that the correction can be conducted by setting the radiation energy to 5.1 J when the increment of the optical loss value is 0.3 to 0.5 dB, to 5.7 J when 0.5 to 1.0 dB, to 6.4 J when 1.0 to 2.0 dB, to 7.0 J when 2.0 to 3.0 dB, and to 7.5 J when more than 3.0 dB.

The correction is conducted by repeating a correction step a plurality of times. In the correction step, until a value of the optical loss falls into a range of ±0.01 dB, compared to that measured at the optical axis alignment carried out before the welding and fixing, an external force is applied to a joint portion to find out a hit location showing a reduced optical loss, then a YAG laser is radiated to an opposite location to the hit location with the collimator therebetween.

As a result, as shown in Table 2, as to an optical loss between the input collimator 14 and the output collimator 18, the optical loss, which showed 0.22 dB at the optical axis alignment, then lowered to 0.30 dB by the welded fixing, can be raised up to 0.23 dB by the foregoing correction. As to an optical loss between the input collimator 16 and the output collimator 18, the optical loss, which showed at first 0.30 dB at the optical axis alignment, then lowered to 4.1 dB by the welded fixing, can be raised up to 0.29 dB by the foregoing correction.

TABLE 2

|  | At optical axis alignment | After welded fixing | After correction |
| --- | --- | --- | --- |
| Between first input and output collimator | 0.22 dB | 0.30 dB | 0.23 dB |
| Between second input and output collimator | 0.30 dB | 4.1 dB | 0.29 dB |

When a laser beam is radiated onto a location on the metal-made cylindrical member made of, for example, cast iron, the location begins to dissolve in part, then solidifies gradually due to cooling in course of time and the location contracts little by little. This contraction allows entire optical parts including a laser-radiated location to be pulled toward the radiated location. That is, this is equivalent to the state under which an external force is applied to an opposite location on a joint portion to the radiated location thereon. This opposite location, which is opposite to the radiated location on the joint portion, is a hit location that has been found with an optical loss between optical parts, such as collimators, monitored and that exhibits a maximum reduction in the optical loss. Thus, the optical loss can be lowered. Therefore, displacements of the optical axes between optical parts, which may be found after the welding of the optical parts, can be corrected up to the same level as that acquired by abutting the optical parts.

There are some cases where an optical loss between collimators is still large, even when the laser was once radiated to correct displacements of the optical axes. In such cases, a hit location showing a maximum reduction in optical loss is again searched, then a laser such as a YAG laser is radiated to a location on the joint portion, which is opposite to the hit location with the optical part therebetween. This sequence of operations is repeatedly done until the optical loss falls in a desired range.

Such a technique for adjusting an optical axis can also be applied to a general optical module comprising optical collimators.

As clearly understood from the foregoing explanation, in the optical multiplexing module of the present invention, an optical multiplexing and a prism to change the optical path of input light are contained within an intermediate cavity of the module and arranged along optical axes therein. In addition, one or more input collimators are contained at the input-side end of the module, while a single output collimator is contained at the output-side end of the module. The axes of the one or more input collimators can be adjusted by optical axis adjusting means after manufacturing the module. Accordingly, the optical multiplexing module is higher in degrees of utilization.

Further, in the case of the method of correcting optical axes according to the present invention, after the welded fixing, with an optical loss between optical parts including collimators monitored, an external force is applied in turn to a plurality of arbitrary locations around a joint portion of one collimator. This application allows a hit location showing a maximum reduction in optical loss to be found out. Radiating a laser beam onto an opposite-side location on the joint portion to the hit location with the optical part therebetween leads to an easier correction of displacements of the optical axis with ease.

What we claim is:

1. An optical multiplexing module comprising:
   (a) a cylindrical member which is provided with an intermediate cavity, an optical multiplexing element, a prism configured to change an optical path of incidence light, which are contained along an optical axis in the cavity, a first cylindrical cavity formed at an input side of the cylindrical member, and a second cylindrical cavity formed at an output side of the cylindrical member;
   (b) an output collimator contained and fixed in the second cylindrical cavity;
   (c) an input collimator contained and fixed in the first cylindrical cavity; and
   (d) an optical axis adjusting device interposed between the cylindrical member and input collimator and configured to adjust an optical axis of the input collimator toward the output collimator.

2. The optical multiplexing module of claim 1, wherein the optical axis adjusting device for the input collimator comprises:
   (a) a ring having a first end surface welded to an end surface of the cylindrical member and a second end surface oppositely positioned to the first end surface, each of the first and second end surfaces being formed into a spherical surface, and
   (b) a flange being formed at an intermediate part of a cylinder of the collimator and having a tip formed as a flat surface, the flange being line-contacted to the spherical surface (38a) and being welded to the ring.

3. The optical multiplexing module of claim 2, wherein the welding is laser welding.

4. The optical multiplexing module of claim 3, wherein the laser welding is either one of YAG laser welding and excimer laser welding.

5. The optical multiplexing module of claim 2, wherein the welding is carried out so that an intensity of input light to the module and an intensity of output light from the module are measured and a loss between the measured intensity are minimized.

6. The optical multiplexing module of claim 2, wherein after the welding, the intensity of input light to the module and the intensity of output light from the module are measured again, and the welding is carried out so that the loss between the measured intensity is minimized.

7. A method of adjusting an optical axis of an optical multiplexing module, comprising the steps of:
   (a) preparing a cylindrical member which is provided with a cavity, an optical multiplexing element and a prism for changing an optical path of incidence light, which are contained along an optical axis in the cavity, a first cylindrical cavity formed at an input side of the cylindrical member, and a second cylindrical cavity formed at an output side of the cylindrical member;
   (b) inserting an output collimator into a cylinder of the second cylindrical cavity, then secured to the cylindrical member by welding; and
   (c) initially fixing an input collimator into the first cylindrical cavity, then optical axes of the input collimator and the output collimator are substantially aligned by positionally adjusting the input collimator so that a measured optical loss between the input and output collimators is minimized.

8. The method of claim 7, wherein the adjusting and fixing include
   (a) spot-welding a ring to an end surface of the cylindrical member, the ring having a first end surface and a second end surface oppositely positioned to the first end surface, each of the first and second end surfaces being formed into a spherical surface, and
   (b) contacting a tip of a flange being formed at an intermediate part of a cylinder of the collimator with the spherical surface of the ring, then adjusting an angle of the ring to the flange and spot-welding the flange to the ring.

9. The method of claim 7, wherein the fixing is carried out a plurality of times.

10. The method of claim 9, wherein the fixing carried out at and after the second time comprising:
    (a) monitoring an optical loss between the optical input-side collimators and the optical output-side collimator, applying an external force in turn to a plurality of arbitrary positions along a peripheral of a connected part of one collimator to search a hit point showing a maximum reduction in the optical loss; and
    (b) carrying out the spot welding at a position of the collimator opposite to the hit point by 180 degrees.

11. The method of claim 8, wherein the spot welding is laser welding.

12. The method of claim 11, wherein the laser welding is either one of a YAG laser and an excimer laser.

13. An optical multiplexing module comprising:
    (a) a cylindrical member which is provided with an intermediate cavity, an optical multiplexing element, a prism configured to change an optical path of incidence light, which are contained along an optical axis in the cavity, a first cylindrical cavity formed at an input side of the cylindrical member, and a second cylindrical cavity formed at an output side of the cylindrical member;
    (b) an output collimator contained and fixed in the second cylindrical cavity; and
    (c) an input collimator contained and fixed in the first cylindrical cavity;
    (d) means for adjusting the optical axis of the input collimator to be substantially aligned with an optical axis with the output collimator.

* * * * *